Figure 1:
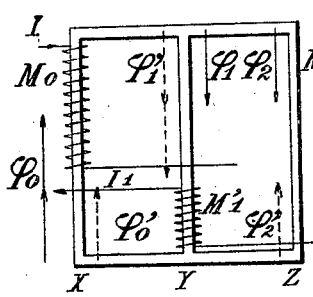

No. 808,532. PATENTED DEC. 26, 1905.
A. J. FRAGER.
INDUCTION METER.
APPLICATION FILED OCT. 31, 1903.

6 SHEETS—SHEET 1.

Witnesses:
Stephen Kinsta
W. Max. Durrell

Inventor
A. J. Frager
by Wilkinson & Fisher
his attorneys

No. 808,532. PATENTED DEC. 26, 1905.
A. J. FRAGER.
INDUCTION METER.
APPLICATION FILED OCT. 31, 1903.
6 SHEETS—SHEET 2.
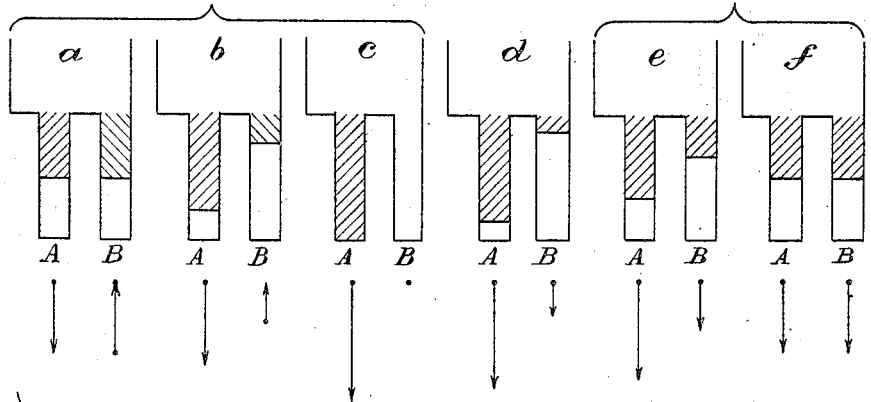
Fig. 13. Fig. 14.
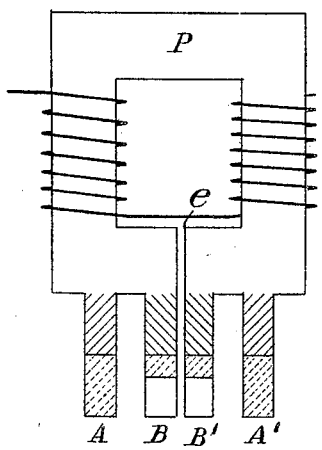
Fig. 15.
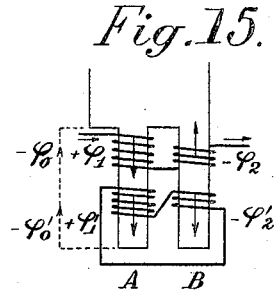
Fig. 20.
Fig. 21.
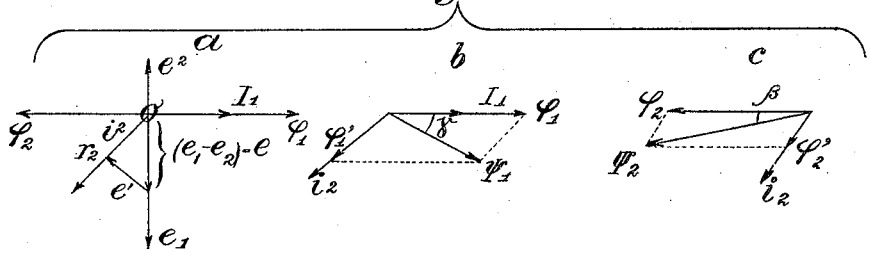
Fig. 10. Fig. 11. Fig. 12.
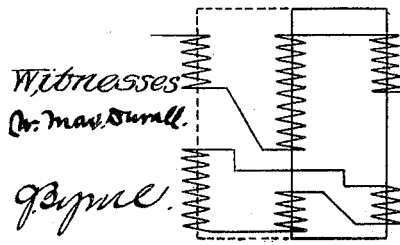
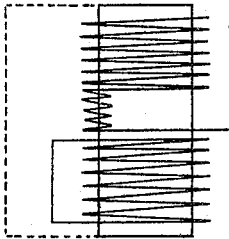
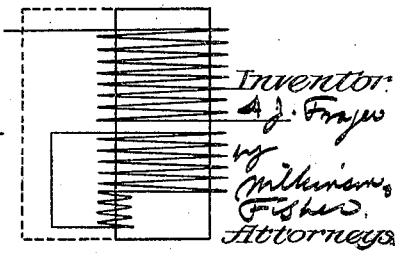
Witnesses
Inventor No. 808,532. PATENTED DEC. 26, 1905.
A. J. FRAGER.
INDUCTION METER.
APPLICATION FILED OCT. 31, 1903.
6 SHEETS—SHEET 3.
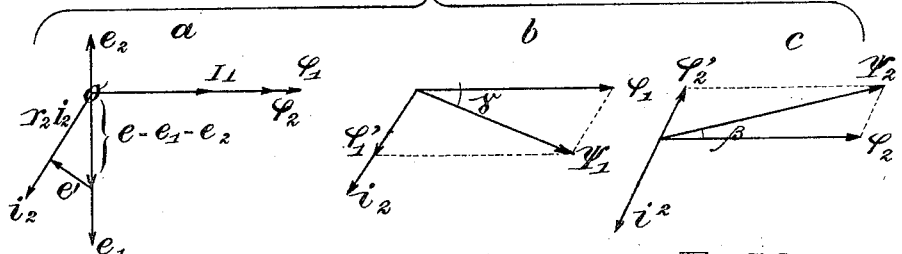
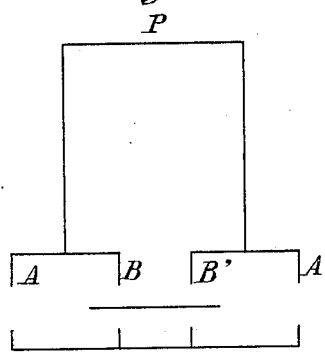
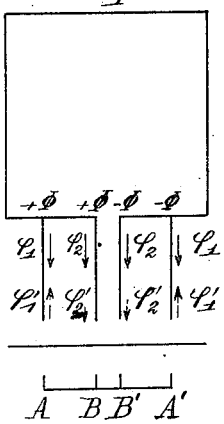
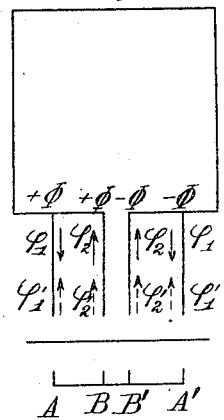
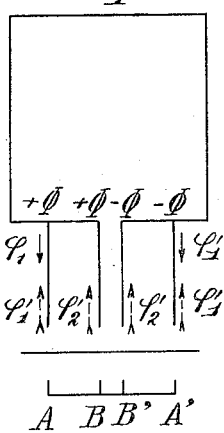
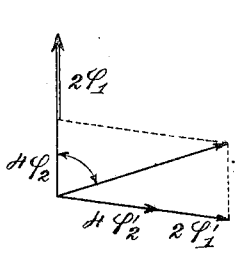
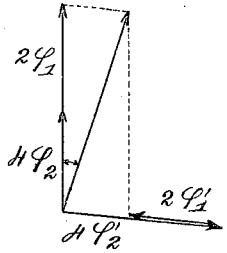
Witnesses.
W. Max. Duvall
G. Byrne
Inventor.
A. J. Frager,
by Wilkinson & Fisher,
Attorneys.

No. 808,532.
PATENTED DEC. 26, 1905.
A. J. FRAGER.
INDUCTION METER.
APPLICATION FILED OCT. 31, 1903.
6 SHEETS—SHEET 4.
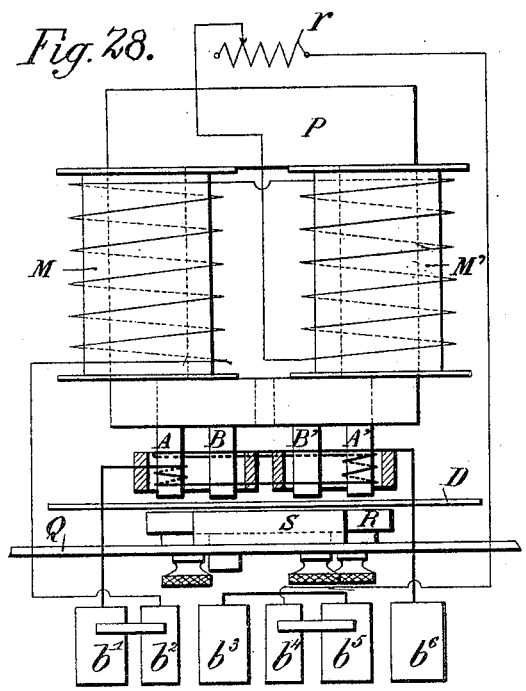
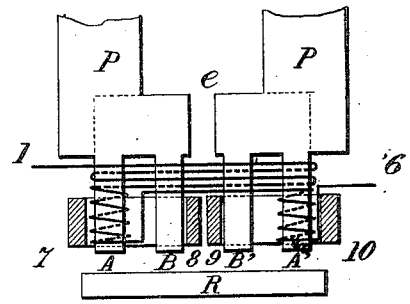
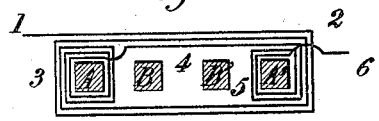
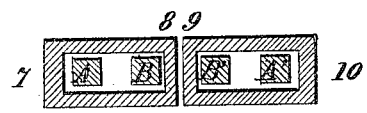
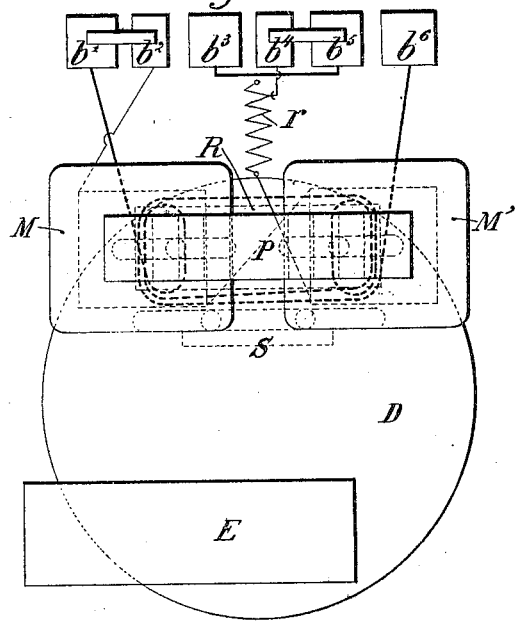
Witnesses.
Inventor.
A. J. Frager
by Wilkinson & Fisher
his Attorneys.

No. 808,532. PATENTED DEC. 26, 1905.
A. J. FRAGER.
INDUCTION METER.
APPLICATION FILED OCT. 31, 1903.

6 SHEETS—SHEET 5.

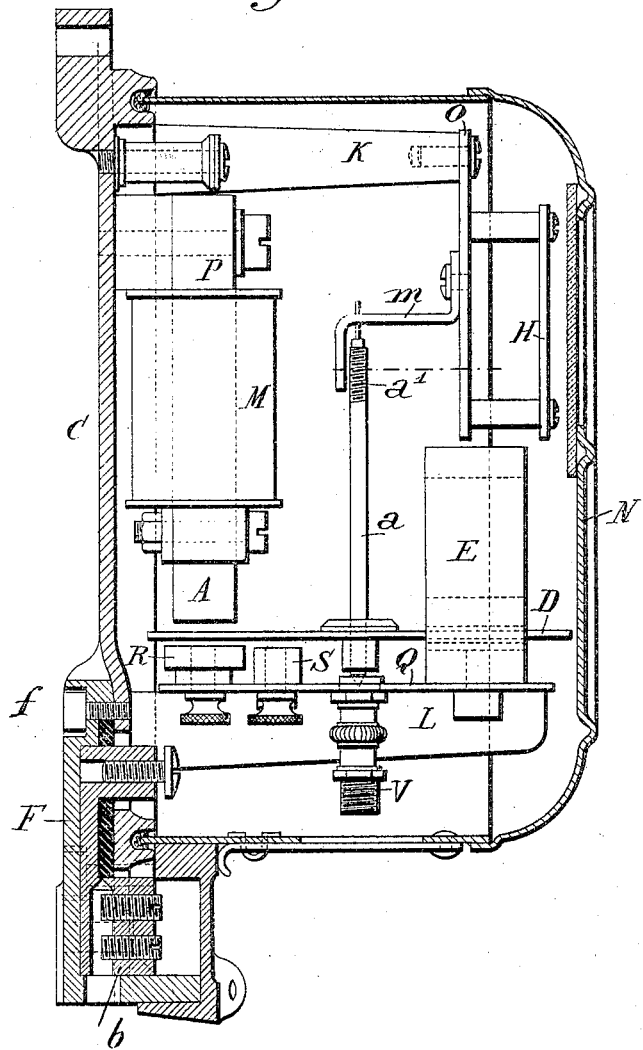

UNITED STATES PATENT OFFICE.

ALPHONSE JEAN FRAGER, OF PARIS, FRANCE, ASSIGNOR TO COMPAGNIE POUR LA FABRICATION DES COMPTEURS & MATÉRIEL D'USINES À GAZ, OF PARIS, FRANCE.

INDUCTION-METER.

No. 808,532.     Specification of Letters Patent.     Patented Dec. 26, 1905.

Application filed October 31, 1903. Serial No. 179,374.

*To all whom it may concern:*

Be it known that I, ALPHONSE JEAN FRAGER, engineer, a citizen of the Republic of France, residing at 16 Boulevard de Vaugirard, Paris, France, have invented a new and useful Improvement in Induction-Meters, (for which Letters Patent have been applied for in France under date of February 26, 1903, No. 329,885, and in Germany under date of May 6, 1903,) of which the following is a specification.

The present invention has for its object an apparatus of the induction-meter type in which the output is indicated on a series of dials by indexes set in motion by a driving-shaft which bears a disk or a conductor rotating under the action of two systems of fluxes, one of which is proportional to the potential difference of the current to be measured and has a lag equal to an angle $\alpha$ behind this potential difference, while the other is proportional to the volume of said current and has a lead equal to an angle $\beta$ on said current. Special devices allow an adjustment of $\alpha$ and $\beta$, so that they are made complementary. Therefore under these conditions the speed of the disk is proportional to the energy spent in the circuit irrespective of the phase displacement of current in the latter, and the apparatus constitutes a perfect wattmeter. If the shaft instead of rotating freely is fixed to a spring acting against its movements, its angular deflections will give the value of energy by means of an index movable on a scale constituting an exact wattmeter, to which all hereinafter-described devices may be applied.

Figure 2:
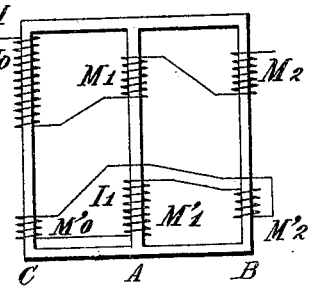
Figure 3:
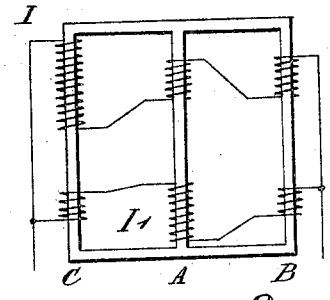
Figure 4:
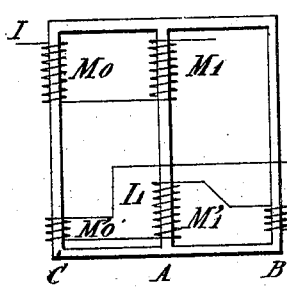
Figure 5:
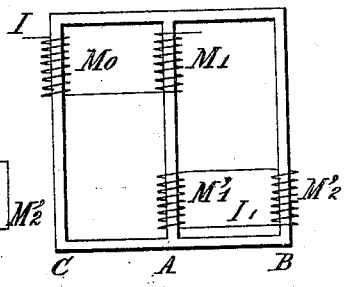
Figure 6:
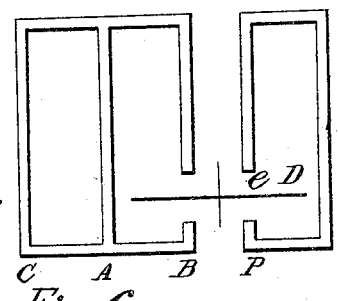
Figure 7:
Figure 9:
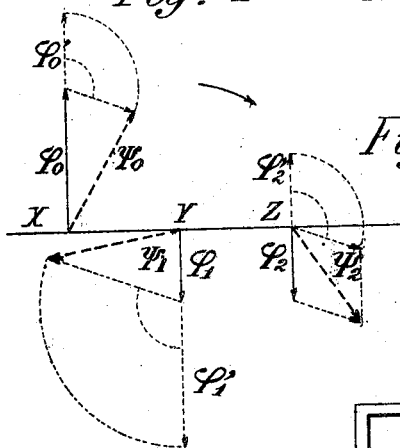
Figure 8:
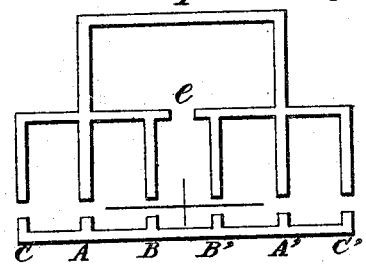
Figure 30:
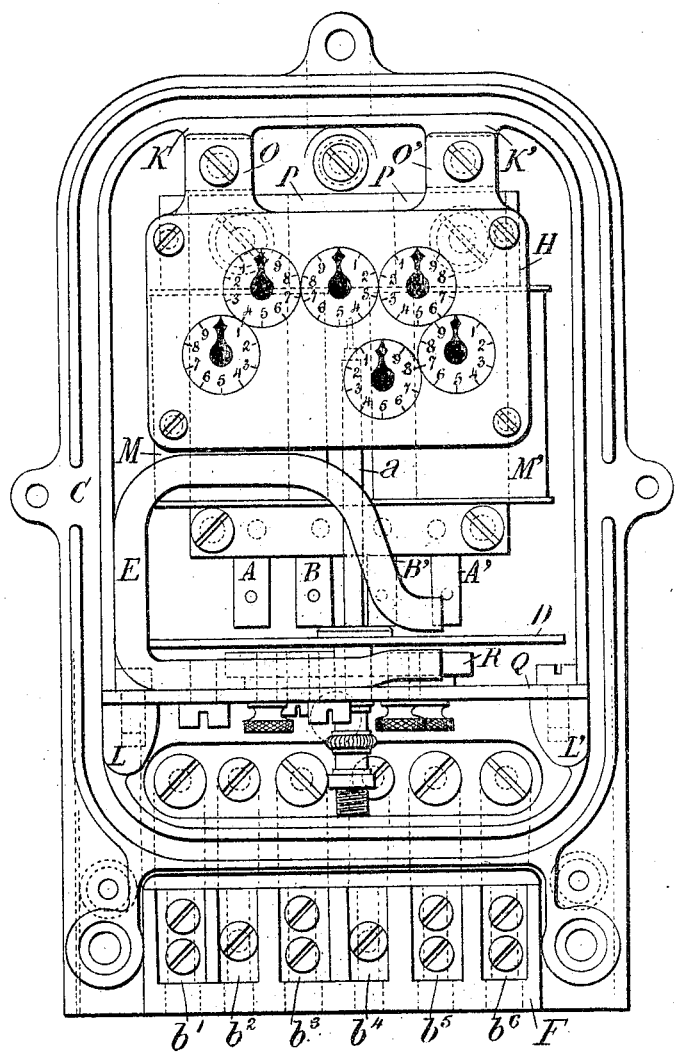

In the accompanying drawings, forming part of the present specification, Figure 1 is a diagram of a three-core transformer indicating the fluxes traversing the same. Fig. 2 shows a mode of winding said transformer. Fig. 3 shows a transformer provided with two windings connected in parallel. Figs. 4 and 5 show two other modes of winding, producing no primary flux in one of the cores of the transformer. Fig. 6 shows the combined action on a disk of a three-core transformer energized by the current to be measured and a magnet energized proportionally to the potential difference. Figs. 7 and 8 show the insertion of one or two three-core transformers, respectively, in the magnetic circuit of the shunt-magnet. Fig. 9 is a polar diagram of the fluxes. Fig. 10 shows another mode of winding a three-core transformer. Figs. 11 and 12 show the windings corresponding, respectively, to the windings of Figs. 10 and 2, according to a modification in which one of the cores is no longer apparent, but is constituted by exterior magnetic shunts. Figs. 13 to 19, inclusive, are diagrams illustrating the principles of my invention. Figs. 20 to 24 are polar diagrams of the fluxes. Fig. 25 is an elevation of the windings as used in practice. Figs. 26 and 27 are separate top views of the primary and secondary windings. Figs. 28 and 29 are an elevation and a top view, respectively, of the general arrangement of windings and connections. Fig. 30 is a front view, and Fig. 31 is a side view, of the complete apparatus.

In putting my invention into practice in order to obtain fluxes proportional to the volume of current I make use of a special device, the principle of which will now be described.

A magnetic circuit is composed, as is the case in three-phase transformers, of three cores, the ends of which are connected together by two cross-pieces, the whole being made of laminated iron, Fig. 1. If a coil $M_0$, carrying the main current I, be wound on the core X, said coil produces in its core an ascending flux $C_0$, which separates into two fluxes $C_1$ and $C_2$, descending through the two other cores. By neglecting the exterior leakage we obtain $C_0 = C_1 + C_2$. These three fluxes are shown in full lines in Fig. 1. If in like manner a second coil $M'_1$, carrying the auxiliary current $I_1$, be wound on the second core Y, this coil produces in its core a descending flux $C'_1$, which in its turn separates into two fluxes $C'_0$ and $C'_2$, ascending through the two other cores. We obtain also $C'_1 = C'_2 + C'_0$. Said three fluxes are shown by dotted lines.

Fig. 1 shows the respective directions of the fluxes, supposing that the currents I and $I_1$ are in phase. It will be seen that the component fluxes produced by both currents are similarly directed in the branches X and Y and oppositely directed in branch Z. If a lag be given to current $I_1$ with respect to current I, the fluxes $C'_0$ $C'_1$ $C'_2$ will assume the positions indicated diagrammatically in Fig. 9, so that the resulting fluxes $\psi_0$ $\psi_1$ of cores X Y lag behind $C'_0$, while the third branch produces a resulting flux $\psi_2$, which leads on flux $C_2$, and consequently on current I.

The case above considered, in which the currents I and $I_1$ act only by means of two coils wound on two different cores, is the simplest one; but it is possible to obtain the same result, first, by adding to coil $M_0$ two coils $M_1$ and $M_2$, wound, respectively, on cores Y and Z, traversed by the main current I, and calculated so as to maintain a suitable relation between the fluxes $C_0$ $C_1$ $C_2$ without changing their direction; second, by adding in the same way to coil $M'_1$ two coils $M'_2$ $M'_0$, wound, respectively, on cores X and Z and performing the same function with respect to flues $C'_0$ $C'_1$ $C'_2$.

Two different means may be employed in order to have the auxiliary current $I_1$ proportional to current I and lagging by a certain angle behind it. The first means consist in short-circuiting the auxiliary circuit, in which case the main current I induces therein a current $I_1$ lagging behind I by the required angle, the three-core magnetic circuit acting then in the same manner as a true three-core transformer, Fig. 2. The second means consists in connecting both electric circuits in parallel by introducing into the general arrangement of coils a certain amount of asymmetry, which results in a corresponding phase displacement, even if the circuits have the same time constant. One of the currents I will then lead on the other $I_1$ on account of the mutual induction of both branches, and the same result is obtained as in the first case, Fig. 3.

The above-described device may be used in the construction of a wattmeter in causing the flux $\psi_2$, leading on the current I by an angle $\beta$, to act on a disk together with a shunt-flux which lags behind the potential by an angle $\alpha$. An exact wattmeter is obtained by regulating the angles $\alpha$ and $\beta$ so that they are complementary, the acting fluxes being then in quadrature. Such a wattmeter is shown in Fig. 6, in which the disk is engaged on the one side in an air-gap provided in core B and on the other side in the air-gap $e$ of the shunt-electromagnet P; but the indications given by such wattmeters are neither exact nor even constant if small currents have to be measured by reason of the remanent magnetism of the iron cores. In my phase displacement device such disadvantage is avoided by inserting the core of the current-coil in the magnetic shunt-circuit so that the shunt-flux going from one cross-piece to the other energizes continuously said cross-pieces and the three cores from pole to pole, as shown in Fig. 7; but then in order to avoid mutual induction between the shunt-circuit and the main circuit it is necessary to calculate individually each system of coils $M_0$ $M_1$ $M_2$ and $M'_0$ $M'_1$ $M'_2$, so that there will be no magnetic potential difference between the two cross-pieces. Figs. 2, 4, and 5 show three different arrangements of such a system of coils, it being supposed that the reluctances are the same in the three branches.

In Fig. 2
$$M_0 = 2M_1 = 2M_2$$
$$2M'_0 = M'_1 = 2M'_2$$

In Fig. 4
$$M_0 = M_1 \quad M_2 = O$$
$$2M'_0 = M'_1 = 2M'_2$$

In Fig. 5
$$M_0 = M_1 \quad M_2 = O$$
$$M'_0 = O \quad M'_1 = M'_2$$

Instead of suppressing the potential differences between the cross-pieces the same result may be obtained by compensating their effects by symmetry by mounting on the two poles of the shunt-electromagnet two three-branch magnetic circuits arranged symmetrically, Fig. 8, and the connected lower cross-pieces of which close the magnetic circuit of the shunt-current. The main circuits of said transformers are connected in series, as well as the auxiliary circuits, so that the electromotive forces induced in the two half parts of the apparatus are equal and opposed.

In an apparatus so constructed the fluxes of the same origin being in phase have no reaction upon each other. The torques due to the actions between primary and secondary circuits are neutralized by reason of symmetry, so that the only actions to be taken into account are between the shunt-flux and the primary and secondary fluxes, respectively. Let $\alpha$ designate the angle of lagging of the shunt-flux behind the potential difference E, and $\beta$ the angle of leading of the resulting flux on the main current I. The torque resulting from the several actions is K E I sin, $(\alpha + \beta,)$ and by regulating $\alpha$ and $\beta$ so that they are complementary said torque becomes K E I, so that an exact wattmeter for displaced or non-displaced currents is obtained.

In the apparatus shown in Fig. 8 I cause only the fluxes of branches B and B' to act upon the disk, together with the shunt-flux. It is possible by bringing the two transformers nearly together to cause the disk to be acted upon by two other fluxes taken from the transformers in order to combine their actions with those of the first two. By this action of four branches instead of two branches either a reinforcing of the lead or a reinforcing of the torque is obtained, according to whether the four primary fluxes or the four secondary fluxes have the same direction.

If in the above-described device the two secondary coils are left independent instead of being mounted in series, the shunt-flux induces in said coils a current which tends to give the shunt-flux an additional lag, while the main fluxes induce currents which tend to give the main-current flux a lead. In this way two concordant actions are secured, thus more easily obtaining an exact and strong wattmeter.

Throughout the foregoing I have shown three cores; but nothing will be altered as to principle and result obtained if one of these cores does not really exist and is only a schematic illustration of the exterior magnetic circuit. The coils of the suppressed core are then wound on the remaining cores, and the coil systems shown in Figs. 10 and 2 are then wound in the manner shown in Figs. 11 and 12, respectively.

The manner in which a phase displacement of ninety degrees is obtained between the fluxes of the shunt and series coils which is necessary to accurate measurement in this type of meter can be more clearly described by reference to Figs. 13 to 24. The core P in Fig. 13, which carries the shunt-winding, is provided with four polar projections A B B' A', separated by an air-gap $e$. Both halves A B and B' A' are symmetrically disposed and wound in the same manner, so that it will be sufficient to explain the different windings and the production of the fluxes for one pair of pole-pieces A B. In order to produce the lead of the main-current field, the pole-pieces A and B carry primary windings, which are traversed by the main current, and secondary windings short-circuited in such a way that they produce in the pole-piece B a resulting flux which leads on the main or inducing current and which is made to act upon the moving disk. The several arrangements of windings which may be wound upon the pole-pieces A and B may be divided into six groups, Fig. 14, which in the present case are intended as well for the primary windings as for the secondary windings.

In Fig. 14 the kind of winding is shown on each pole-piece, so that the length of the hatchings is proportional to the number of turns, and the direction of said hatchings indicates in each case the sense of the winding. The arrows under the figures show in magnitude and direction the fluxes produced by the corresponding winding. The several figures are differentiated in that in each case a determined number of turns is removed from one of the pole-pieces and arranged upon the other. In Fig. 14$^a$, for instance, two equal fluxes of opposite sense are produced. In Figs. 14$^b$ and 14$^c$ the flux increases in branch A and decreases in B, and it is hereby necessary, as in all the following figures, that a part of the produced fluxes be carried in an outer air branch. In Fig. 14$^f$ it is even the whole sum of the fluxes produced in both branches which is so carried. The six groups may therefore be divided as follows: first, Figs. 14$^a$ and 14$^b$, two fluxes of different directions; second, Fig. 14$^c$, only one flux; third, Figs. 14$^d$, 14$^e$, and 14$^f$, fluxes of the same direction.

In order to obtain the necessary lead in the branch B, the following requirements must be met: first, that the two electromotive forces resulting from the mutual induction between the main and secondary coils in each of the two parts A and B of the secondary winding be of opposite sense; second, that the mutual induction between the two windings of A be preponderant over the mutual induction between the two windings of B. Therefore the total electromotive force due to the mutual induction between the primary and the secondary will be, according to the first condition, equal to the difference between the two partial electromotive forces produced in branches A and B and said difference will be the same as that induced in branch A, the phenomena being predominant in said branch according to the second condition. The first condition is met with in the following manner: If the primary windings be of opposite sense upon A and B, as in Figs. 14$^a$ and 14$^b$, the secondary windings must be of the same sense as in Figs. 14$^e$ and 14$^f$, and, vice versa, if the primaries are of the same sense the secondaries must be of opposite sense. The second condition is met with by giving the coil A more turns than is given to B. This is obtained in all combinations:

$$\begin{cases} 14^b, 14^c, \text{ or } 14^d \text{ primary,} \\ 14^e \text{ or } 14^f \text{ secondary,} \end{cases}$$

$$\begin{cases} 14^d, 14^e, \text{ or } 14^f \text{ primary,} \\ 14^b \text{ or } 14^c \text{ secondary,} \end{cases}$$

A having always more turns than B, or at least as many. The combination of 14$^a$ with 14$^f$ must, however, be rejected, because the natural induction phenomena are exactly balanced, so that the desired effect could not be obtained. Again, any combination employing 14$^c$ as a secondary is to be rejected, because no secondary flux would traverse B where the resulting flux has to be brought in.

We will now demonstrate that when the above-mentioned conditions are met with the desired lead of the flux is obtained in the branch B. Assuming, for instance, the combination of 14$^a$ as primary and 14$^e$ as secondary coil, which is the one shown in Fig. 13, in the vector diagram of Fig. 21$^a$, I$_1$ is the volume of the current in the primary coil and $\varphi_1$ the flux produced in the branch A by the primary coil, which flux by the well-known equation is:

$$\varphi_1 = \frac{4\pi n_1 I_1}{R}$$

$\varphi_2$ is the flux produced in the branch B by the primary coil, which flux $$\varphi_2 = \frac{-4\pi n_2 I_1}{R'}$$

and is negative, this branch being coiled in the opposite sense. $\varphi_1$ creates, through the corresponding portion of the secondary winding, an electromotive force $e_1$, due to mutual induction, which force $$e_1 = -n'_1 \frac{d\varphi_1}{dt}$$

and is in quadrature with $\varphi_1$. $\varphi_2$ creates in the same way through the second branch of the secondary an electromotive force $$e_2 = -n'_2 \frac{d\varphi_2}{dt}$$

which is in opposition with $e_1$, because $\varphi_2$ is opposed to $\varphi_1$ and smaller than $e_1$, because $n'_2 < n'_1$ and $$\frac{d\varphi_2}{dt} = \frac{d\varphi_1}{dt}$$

because $\varphi_2 = \varphi_1$. So the conditions mentioned under first and second are met with. The resulting electromotive force, due to mutual induction, is therefore $e_1 - e_2 = e$. It is this electromotive force which geometrically shortened by the electromotive force $e' = k\frac{di_2}{dt}$, due to the self-induction of the secondary winding, determines the magnitude and phase of the current $i_2$. Said current is seen to be comprised within the angle $e_1 \, o \, \varphi_2$. Said current creates the secondary fluxes $$\varphi'_1 = +\frac{4\pi n'_1 i_2}{R}$$

in A and $$\varphi'_2 = +\frac{4\pi n'_2 i_2}{R}$$

in B, and the composition of said fluxes with $\varphi_1$ and $\varphi_2$ gives the resulting fluxes $\psi_1$ and $\psi_2$ really existing in the branches A and B. These compositions are indicated by the diagrams of Figs. 21$^b$ and 21$^c$, which are derived from 21$^a$ as regards the phase of $i_2$ and of the fluxes $\varphi_1$ $\varphi_2$ $\varphi'_1$ $\varphi'_2$ and which show that the resulting flux $\psi_1$ of A has a lag equal to an angle $\delta$ behind the inducing-flux $\varphi_1$, but that the resulting flux in B has a lead equal to an angle $\beta$ on the inducing-flux $\varphi_2$, the desired effect being thus obtained. The combinations of the windings 14$^b$ and 14$^c$ as primary windings with 14$^e$ as the secondary one produce the same phenomena. They only differ from the preceding combination in that $\varphi_1 > \varphi_2$. The second of the required conditions is thus obtained even more fully. Again, the combinations of the windings 14$^b$ or 14$^c$ as primaries with 14$^f$ as secondary satisfy the requirements, because $e_1$ and $e_2$ are always in opposition and $e_1 > e_2$, $\varphi_1$ being greater than $\varphi_2$ and $n'_1$ being greater than $n'_2$. Inversely, the combination of a winding such as 14$^e$ or 14$^f$ as primary with a winding such as 14$^a$, 14$^b$, or 14$^c$ as secondary again fulfils the requirements and gives a resultant flux leading in B. This may be demonstrated as follows: Assuming that 14$^f$ be the primary winding and 14$^b$ the secondary, Fig. 22$^a$, the primary fluxes $\varphi_1$ and $\varphi_2$ produced in A and B are equal and of the same direction, because $n_1 = n_2$ $\varphi_1$ produces in the corresponding part of the secondary an electromotive force $e_1$ due to mutual induction, which electromotive force $$e_1 = -n'_1 \frac{d\varphi_1}{dt}.$$

$\varphi_2$ produces in the second branch of the secondary winding an electromotive force.

$$e_2 = -(-n'_2)\frac{d\varphi_2}{dt} = +n'_2 \frac{d\varphi_2}{dt}.$$

Both conditions are again realized, $e_1$ and $e_2$ being of opposite sense and $e_1 > e_2$, because $n'_1 > n'_2$. We deduce therefrom the secondary current $i_2$, which produces secondary fluxes $$\varphi'_2 = +\frac{4\pi n'_1 i_2}{R}$$

in A and $$\varphi'_2 = -\frac{4\pi n'_2 i_2}{R}$$

in B. $\varphi'_2$ is negative, the windings being of opposite sense. Their respective compositions with $\varphi_1$ and $\varphi_2$ (shown in Figs. 22$^b$ and 22$^c$) give the resulting fluxes $\psi_1$ and $\psi_2$ really existing in branches A and B. $\psi_1$ lags behind $\varphi_1$ by an angle $\delta$, and $\psi_2$ leads on $\varphi_2$ by an angle $\beta$. The combinations of 14$^f$ as a primary with 14$^e$ as a secondary, and of 14$^e$ as a primary with 14$^a$ 14$^b$ 14$^c$ as a secondary give the same result, the difference with the preceding case consisting in the greater difference between the values of $e_1$ and $e_2$.

As stated before, the branches A B B' A', provided with the above-mentioned windings, are made to act upon the rotary disk, the following advantages being obtained by the symmetrical disposition of the windings: First, the electromotive forces due to induction which may be created between said windings and the shunt-windings are neutralized, and, second, all retarding or braking moments non-proportional to the energy spent in the circuit, but produced by the current to be measured, are eliminated.

The diagram of Fig. 16 shows a form of execution in which only the branches B B', in which the resulting flux is leading, are made to act upon the disk.

As shown in Figs. 17, 18, and 19, the four branches A B B' A' may also be united, so as to form one group and act together upon the disk.

With a primary winding according to Figs. 14$^e$ or 14$^f$ and a secondary winding according to Figs. 14$^b$ or 14$^c$ the fluxes indicated in Fig.

17 are created, and six couples of forces are thus obtained with the shunt-flux $\Phi$:

1. between A and B, one couple proportional to .................. $- \varphi_1 \phi$
2. between A and B, one couple proportional to .................. $+ \varphi_2 \phi$
3. between B and B', two couples proportional to ............ $+ \varphi_2 \phi$
4. between B' and A', one couple proportional to .................. $+ \varphi_2 \phi$
5. between B' and A', one couple proportional to .................. $- \varphi_1 \phi$ The total couple is therefore proportional to $K (4 \varphi_2 - 2 \varphi_1) \Phi$. In the same way the four secondary fluxes produce with the fluxes $\Phi$ a total couple which is proportional to $$K' (4 \varphi'_2 + 2 \varphi'_1) \Phi,$$

so that the resulting total couple is $$K [4 (\varphi_2 + \varphi'_2) - 2 (\varphi_1 - \varphi'_1)] \Phi.$$

As before explained, the flux $\varphi'_2$ has a lead on $\varphi_2$, and as $\varphi'_1$ lags behind $\varphi_1$ so $\varphi'_1$ has also a lead on $\varphi_1$, so that the same result is obtained as if the resulting couple were created by a flux leading on the current volume, and the desired effect is therefore again secured.

In the device of Fig. 18 the total of the six couples due to the primary fluxes is $$K (4 \varphi_2 + 2 \varphi_1) \Phi,$$

and that of the six couples due to the secondary fluxes is $K (4 \varphi'_2 - 2 \varphi'_1) \Phi$. The total resulting couple is thus $$K[4 (\varphi_2 + \varphi'_2) + 2 (\Phi^1 - \varphi'_1)] \varphi.$$

In this case it is evident that the couple of forces is stronger, but the lead is smaller.

Figs. 23 and 24 show the diagrams corresponding to the windings of Figs. 17 and 18, respectively.

In the device of Fig. 19 the primary winding is arranged according to Fig. $14^d$ and the secondary winding according to Figs. $14^e$ and $14^f$.

The vector diagram of Fig. 20 shows that in this case also a flux is obtained in branch B, which is in quadrature with the shunt-flux. If J be the primary current and $\varphi_1$ the flux produced in branch A, the secondary current $i$ produces in branch B a flux $\varphi'$, leading on J by an angle $\beta$, (or a flux $\varphi''_2$, the lag of which is $\pi - \beta$,) so that both fluxes are in quadrature with the shunt-flux.

The secondary winding of A B B' A' may in all forms of execution either be connected in series or be short-circuited upon each two branches.

Figs. 25 to 29 show the coils as used in practice, and Figs. 30 and 31 show a complete apparatus based on the above-stated principles.

This apparatus is constructed in the following manner: A base C bears four arms K K' and L L'. The two first arms K K' support a recording-clock mechanism H of any usual kind, which does not need to be here described more in detail. The two other arms L L' support a horizontal plate Q, made of zinc or any other suitable non-magnetic material. On the base C is fixed the shunt-electromagnet P, made of laminated iron, and on the branches of which are wound two coils M M', traversed by the shunt-current. This electromagnet is divided at its middle plane by an air-gap $e$, Fig. 25, so as to form two broad poles. Said poles emit, through the extensions A B B' A', fluxes rejoining the armature R. Said armature, which forms the magnetic circuits of the electromagnet, is supported by a plate Q in a slideway in which it is adapted to slide parallel to the extensions A B B' A' of the electromagnet. On said extensions themselves are wound two systems of coils—first, a primary coil 1 2 3 4 5 6, Figs. 25 and 26, traversed by the main current and comprising a coil embracing the four extensions A B B' A' and two coils wound in the same direction around A and A', and, second, a secondary coil constituted by two copper rings 7 8 and 9 10, Figs. 25 and 27. Under these conditions, taking the aforesaid into account, it will be seen that the flux of the shunt-coil will lag in the four extensions or branches A B B' A', while fluxes proportional to current will have a lag in branches A A' and a lead in branches B B'. The fluxes are regulated by means of an adjustable resistance $r$, Figs. 28 and 29, of low self-induction, mounted in series with the shunt-coils M M'. It is necessary that the section of rings 7 8 and 9 10 should be somewhat larger than required in order to give to the meter a lead in excess when a displacement occurs, which excess is corrected by rephasing the shunt-current with respect to the potential difference by adjusting the resistance $r$. The addition of said resistance is advantageous in that it has no influence on the graduating of the meter without displacement, having a strong action upon the displacement of the shunt-current without practically modifying the intensity thereof. A second movable piece S may also be shifted on the horizontal plate Q and permits of obtaining the necessary sensibility on starting and with small outputs, the lateral shifting of said piece producing a certain amount of asymmetry in the fields of the electromagnet, which results in a small torque acting in opposite directions, according as S is near A B or A' B'. The plate Q carries also the permanent magnet E, securing the proportionality of the indications given by the instrument and the movable bearing V of the driving-shaft $a$. The upper end of said shaft is supported in a bracket $m$, Fig. 30, and said shaft, which drives the clock-gear (not shown) of the recording mechanism H by means of worm $a'$, formed thereupon, has fixed upon it a disk D, which passes through the air-gaps of the driving-electromagnets and of the permanent magnet E.

Shaft $a$ is normally supported on a jewel in bearing V; but in order to protect the pivot of shaft $a$ and its jewel against jarring in shipment the bearing V may be removed and replaced in inverse position. It then raises the shaft, and the disk D sticks against the magnet.

A casing F, made of ivorine or other suitable material and fixed to base C, contains the terminals $b'$ $b^2$ $b^3$ $b^4$ $b^5$ $b^6$, to which are respectively connected the ends of the windings and of the conducting-wires.

What I claim, and desire to secure by Letters Patent of the United States, is—

1. The combination with an alternating-current circuit, of means for measuring the true energy therein, comprising a coil connected in shunt, and a coil connected in series with said circuit having a secondary coil in inductive relation therewith and coöperating to produce a plurality of dephased fluxes, and a rotating member arranged within the influence of the shunt and series fluxes; substantially as described.

2. In a motor-meter for alternating currents, the combination of a rotor, a series coil, a shunt-coil acting with the series coil, and a short-circuited coil in inductive relation with the series coil, said series and short-circuited coils having their windings so disposed as to cause leading and lagging flux components with respect to the current; substantially as described.

3. In an electric meter, a shunt or potential coil, a series or current coil, and phase-adjusting means in inductive relation to said current-coil and coöperating therewith to produce a flux in advance of the main current; substantially as described.

4. In an electric meter, a shunt or potential coil, a series or current coil, phase-adjusting means in inductive relation to said current-coil and coöperating therewith to produce a flux in advance of the main current, and means for adjusting the phase of the current in the shunt-circuit; substantially as described.

5. In an electric meter, a shunt-coil, a series coil, phase-adjusting means in inductive relation to said series coil and coöperating therewith to produce a flux in advance of the main current, and means for adjusting the time constant of the shunt-circuit; substantially as described.

6. In an electric meter, a shunt-coil, a series coil, and phase-adjusting means in inductive relation to said series coil and coöperating therewith to produce a flux component displaced ninety degrees from the flux of the shunt-coil; substantially as described.

7. In an electric meter, a shunt-coil producing a lagging flux, a series coil producing a flux substantially in phase with the current, and means in inductive relation with said series coil for causing a flux in advance of the current therein; substantially as described.

8. In an electric meter, a shunt-coil producing a lagging flux, a series coil producing a flux substantially in phase with the current, and means in inductive relation with said series coil for causing leading and lagging components of the flux due to the series coil; substantially as described.

9. In an electric meter, a shunt-coil producing a lagging flux, a series coil producing a flux substantially in phase with the current, and means in inductive relation with said coils for causing a further lag of the shunt-flux and a leading component in the series flux; substantially as described.

10. In an electric meter, a shunt-coil producing a lagging flux, a series coil producing a flux substantially in phase with the current, means in inductive relation with said coils for causing a further lag of the shunt-flux and means for adjusting the time constant of the shunt-circuit; substantially as described.

11. In an electric meter, the combination of a core provided with a potential coil, polar projections on said core, a current-coil carried by said polar projections, and means also carried by said polar projections for displacing the phase of flux therein due to the current-coil; substantially as described.

12. In an electric meter, the combination of a core provided with a potential coil, a slot or air-gap in the magnetic circuit of said core, polar projections located on said core on either side of said slot or air-gap, a current-coil carried by said projections, and a short-circuited coil in inductive relation to said current-coil; substantially as described.

13. In an electric meter, the combination of a core provided with a potential coil, a slot or air-gap in the magnetic circuit of said core, polar projections located on said core on either side of said slot or air-gap, a current-coil carried by said projections, a short-circuited coil in inductive relation to said current-coil, an armature for said core, and a movable member disposed between said armature and core; substantially as described.

14. In an electric meter, the combination of a core provided with a potential coil, a slot or air-gap in the magnetic circuit of said core, polar projections located on said core on either side of said slot or air-gap, a current-coil carried by said projections, and a rotating member arranged within the influence of the resultant fluxes developed in said core and projections; substantially as described.

15. In an electric meter, the combination of a core provided with a potential coil, a slot or air-gap in the magnetic circuit of said core, polar projections located on said core on either side of said slot, a current-coil carried by said projections, and a secondary coil also carried by said projections in inductive relation with said current-coil; substantially as described.

16. In an electric meter, the combination of a core provided with a potential coil, a slot or air-gap in the magnetic circuit of said core, polar projections located on said core on either side of said slot, a current-coil carried by said projections, and a secondary coil in inductive relation with said current-coil arranged to modify the phase of the flux due to the current-coil; substantially as described.

17. In an electric meter, a core having a plurality of polar projections disposed on opposite sides of an air-gap, current and potential coils carried by said core, and means for causing a phase displacement between the fluxes traversing different projections on the same side of the air-gap; substantially as described.

18. In an electric meter, a core having a plurality of polar projections disposed on opposite sides of an air-gap, current and potential coils carried by said core, and means for causing a phase displacement between the fluxes due to the current-coil traversing different projections on the same side of the air-gap; substantially as described.

19. In an electric meter, a core having a plurality of polar projections disposed on opposite sides of an air-gap, current and potential coils carried by said core, and a short-circuited coil on said projections for causing a phase displacement between the fluxes traversing different projections on the same side of the air-gap; substantially as described.

20. In an electric meter, the combination with a core provided with a potential coil, a slot or air-gap in the magnetic circuit of said core, polar projections located on said core on either side of said air-gap, a current-coil on said polar projections having portions on either side of the air-gap unsymmetrically arranged, and a movable disk arranged within the influence of fluxes developed in said core; substantially as described.

21. In an electric meter, the combination with a core provided with a potential coil, a slot or air-gap in the magnetic circuit of said core, polar projections located on said core on either side of said air-gap, a current-coil on said polar projections having a portion disposed about all of said polar projections and other portions disposed about single projections on either side of the air-gap, and a movable disk actuated by said coils; substantially as described.

22. In an electric meter, a core provided with a potential coil and having a plurality of polar projections disposed on opposite sides of an air-gap, and a current-coil on said polar projections having similar portions oppositely arranged on either side of said air-gap, the windings of the coil on the same side of the air-gap being unsymmetrically arranged on the polar projections; substantially as described.

23. In an electric meter, a core provided with a potential coil and having a plurality of polar projections disposed on opposite sides of an air-gap, a current-coil on said polar projections having similar portions oppositely arranged on either side of the air-gap, the windings of the coil on the same side of the air-gap being unsymmetrically arranged on the polar projections, and short-circuited coils about the polar projections on each side of the air-gap; substantially as described.

24. In an electric meter, a core provided with a potential coil and having a plurality of polar projections disposed on opposite sides of an air-gap, and a current-coil on said polar projections having similar portions oppositely arranged on either side of the air-gap, the windings of the coil on the same side of the air-gap having portions wound respectively about all of the projections and about single projections on that side; substantially as described.

In testimony whereof I have signed my name to this specification in the presence of two subscribing witnesses.

ALPHONSE JEAN FRAGER.

Witnesses:
    Louis Rimm,
    Augustus E. Ingram.